J. DRAHER.
FASTENER ASSEMBLING AND ATTACHING MEANS.
APPLICATION FILED AUG. 7, 1913.
1,165,078.
Patented Dec. 21, 1915.
4 SHEETS—SHEET 1.
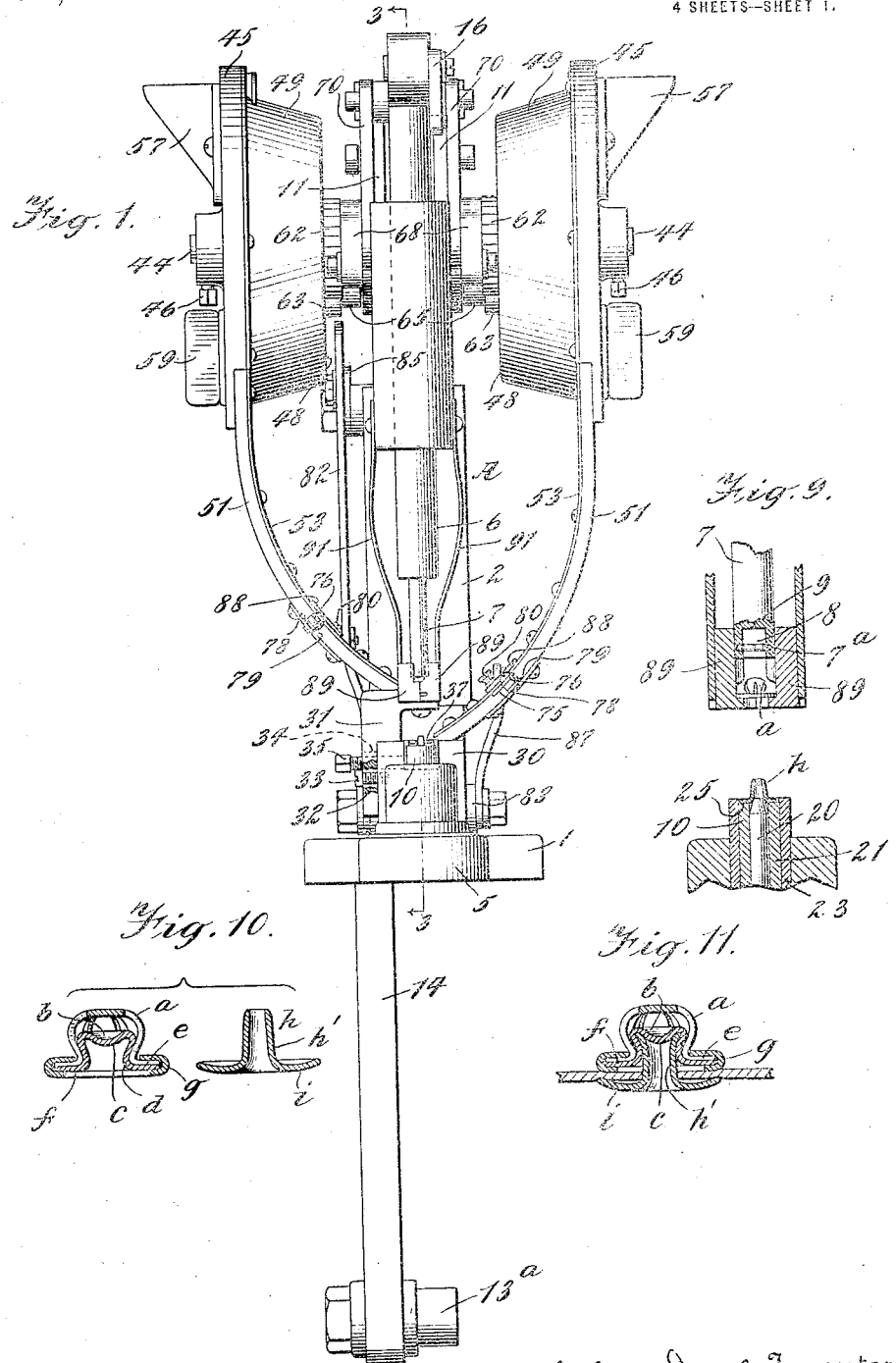
Witnesses:
John Draher, Inventor
By his Attorney Gifford Bull

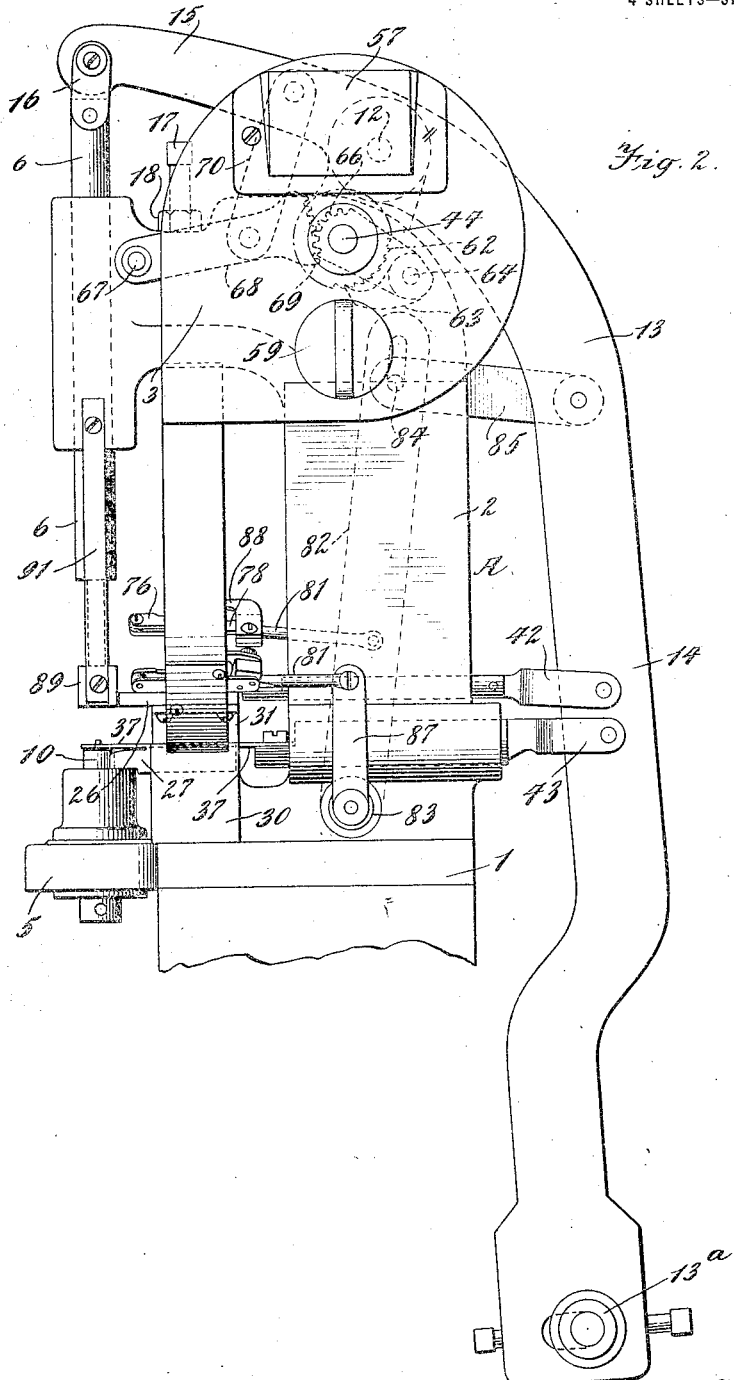

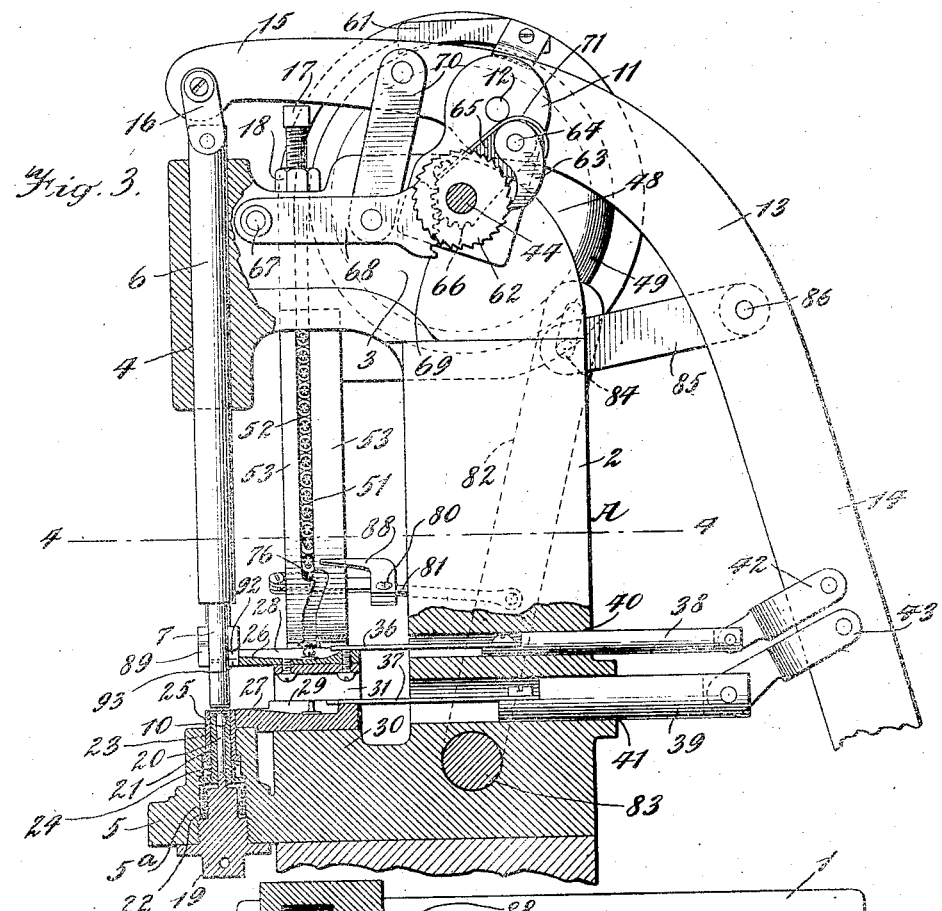
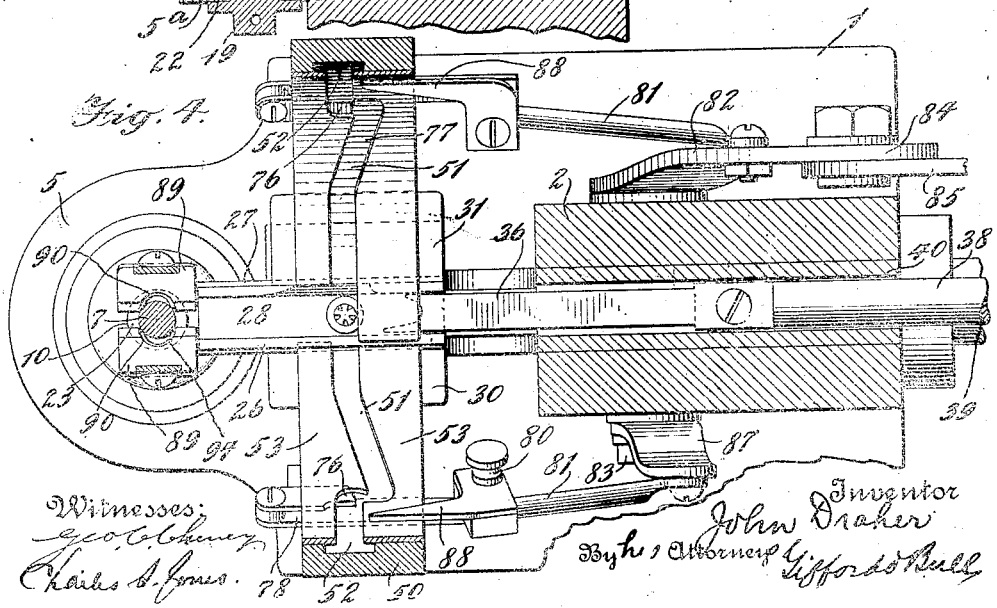

J. DRAHER.
FASTENER ASSEMBLING AND ATTACHING MEANS.
APPLICATION FILED AUG. 7, 1913.
1,165,078.
Patented Dec. 21, 1915.
4 SHEETS—SHEET 4.
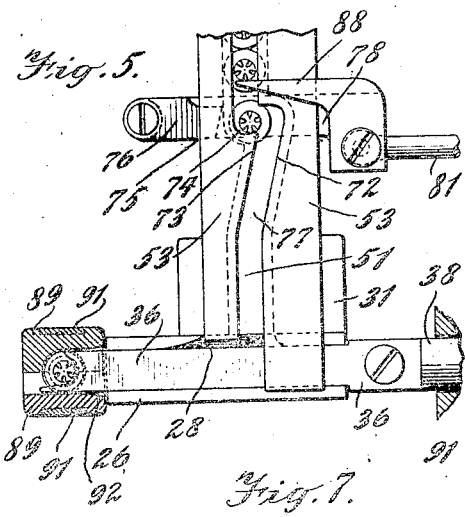
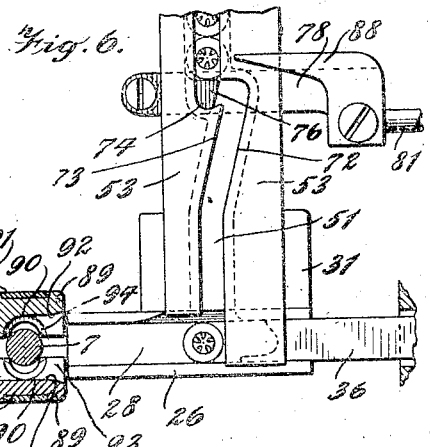
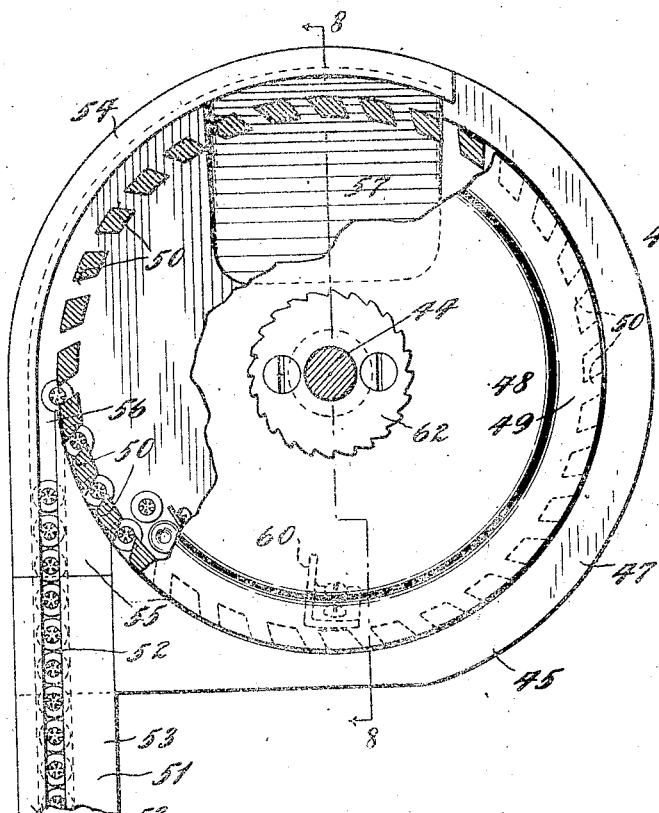
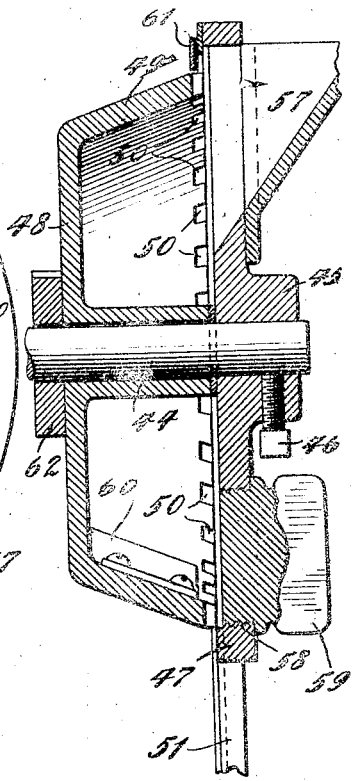

UNITED STATES PATENT OFFICE.

JOHN DRAHER, OF WATERBURY, CONNECTICUT, ASSIGNOR TO LANE MANUFACTURING COMPANY, OF WATERBURY, CONNECTICUT, A CORPORATION OF CONNECTICUT.

FASTENER ASSEMBLING AND ATTACHING MEANS.

1,165,078.

Specification of Letters Patent. Patented Dec. 21, 1915.

Application filed August 7, 1913. Serial No. 783,499.

*To all whom it may concern:*

Be it known that I, JOHN DRAHER, a citizen of the United States, residing at Waterbury, in the county of New Haven, in the State of Connecticut, have invented certain new and useful Improvements in Fastener Assembling and Attaching Means, of which the following is a specification.

My invention relates to new and useful improvements in machines for assembling parts of garment or other fasteners which comprise a plurality of parts which are brought together in a fixed relation to constitute a completed fastener or a member thereof.

The invention is particularly adapted to act upon that type of fastener known as "ball-and-socket" or "head-and-socket" fasteners, and in the embodiment described and illustrated for the purposes of this application is designed to assemble the parts of the head or ball member into completed form and to attach the same to a fabric or garment.

One form of fastener upon which the invention is designed to operate comprises two parts which are brought together and the parts interlocked or clenched together to form a completed fastener member, as will be fully described hereinafter.

I wish it distinctly understood, however, that my invention is not to be limited to use with any specific type of fastener or fastener member, as it may be employed for use in connection with a variety of fasteners.

I also desire it understood that the machine may be employed either for the function of assembling the fastener parts, or performing the functions of assembling parts and attaching them to a garment or fabric.

The invention consists in the improved construction to be more fully described hereinafter and the novelty of which will be particularly pointed out and distinctly claimed.

I have fully and clearly illustrated my invention in the accompanying drawings to be taken as a part of this specification and wherein—

Figure 1 is a view in front elevation of a structure embodying my present invention. Fig. 2 is a view in side elevation of the construction shown in Fig. 1, parts being shown partly in dotted lines, and in different positions from that shown in Fig. 1. Fig. 3 is a vertical central section on the line 3—3 of Fig. 1. Fig. 4 is a horizontal section on the line 4—4 of Fig. 3. Fig. 5 is a semi-diagrammatic view, partly in section, of a portion of one of the feed guides showing a cut-off and feed-plunger in one position. Fig. 6 is a similar view to Fig. 5 showing the cut-off and plunger in another position. Fig. 7 is a view in side elevation with parts broken away, and in section, of one of the drums for containing the fastener parts. Fig. 8 is a section on the line 8—8 of Fig. 7. Fig. 9 is an enlarged vertical central sectional view through the dies for assembling the fastener parts. Fig. 10 is a detail sectional view of parts of one type of fastener upon which the machine is designed to operate; and, Fig. 11 is a central vertical sectional view through the parts shown in Fig. 10 after the same have been assembled.

Before entering into a description of the machine embodying my present invention I will describe briefly one type of fastener or fastener element upon which it may operate. This fastener is shown in Figs. 10 and 11 of the drawings, in the former of which are shown in section the parts before they are assembled, and in the latter after they are assembled and attached to a fabric. In these figures the fastener is shown as comprising a resilient head $a$ in which is inserted an anvil piece or socket $b$ having an anvil projection $c$, and a hollow neck $d$, said head and anvil socket having engaging flanges $e$, $f$, respectively, at the lower ends, which flanges are secured together by an annular collar $g$, all substantially as shown. $h$ designates a shank or stem member consisting of a shank $h'$ and flange $i$, said shank or stem being intended to pierce through a fabric and be passed within the hollow neck $d$, the head and stem member being clamped together by forcibly thrusting the end of the shank $h'$ into engagement with the anvil $c$ which serves to spread and distend the metal of the shank $h'$ into substantially the position shown in Fig. 11. When the parts are united the fabric to which the fastener is attached is securely clamped between the flange piece of the head member and the flange of the shank member. As this fastener constitutes no part of my present invention and the construction thereof is well known in the art, the above description is deemed sufficient for the purposes of this application.

Referring now more particularly to Figs. 1, 2, 3 and 4 of the drawings, A designates generally a frame or stand upon which the moving parts of the machine are assembled for coöperation. This frame or stand consists of a base plate 1 adapted to be secured to any suitable foundation, such as a work table, and preferably cast integral with the rear portion of this base plate is a vertical post or standard 2 having a forwardly-extending overhanging arm 3 provided with a vertical guide passage or bore 4. Also cast integral with the forward part of the base is a projection 5 having a vertical opening $5^a$ therein alining with the opening 4. Arranged to slide in the opening 4 is a plunger 6 carrying at its lower end a die member 7 formed with an opening 8 at its lower end and an impact surface 9 at the bottom of said opening, and designed to coöperate with the socket member in assembling the same with a stud member held by an opposing die 10 supported by the forwardly-projecting part 5. In the present instance the die members 7 and 10 are constructed to act on the particular type of fastener heretofore described but it is obvious that other forms of dies may be employed for operation on other types of fasteners. At the head of the column 2, are vertical parallel ears 11 in which is seated a bearing pin 12, upon which is fulcrumed at a point intermediate its ends, an operating lever 13, consisting of a substantially vertical portion 14 extending in rear of the frame or stand, and a forwardly-extending overhanging portion 15 disposed over the arm 3 and connected to the head of the plunger 6 by a link connection 16 whereby said plunger 6 may be reciprocated through the bore 4 toward and away from the die member 10. The downward movement of the lever 13 in moving the plunger 6 with its die 7 toward the die 10 may be limited by an adjustable abutment preferably consisting of a stop screw 17 threaded into the arm 3 beneath the portion 15 of said lever, said screw being held by an adjusting and locking nut 18, if desired. The lower end of the lever 13 carries a suitable connection $13^a$ preferably a well known form of pin, by means of which said lever may be connected to a foot treadle or power mechanism (not shown) for swinging said lever on its fulcrum.

The construction of the lower die member 10, comprises a plug 19 threaded into the lower part of the opening $5^a$, and carrying a vertical pin 20 surrounded by a sleeve 21, yieldingly supported by a coil spring 22, seated on said plug 19, and surrounding the sleeve 21 is a sleeve 23, normally urged upward by a coil spring 24 seated on a shoulder of the sleeve 21, so as to project above the upper end of said sleeve 21, and form an annular seat or pocket 25 about the pin 20, to receive the stud member of the fastener.

When the member 7 is forced down by the operating lever 13, it moves the head or socket part of the fastener down onto the stud member supported on the die 10, serving to expand the stud member to lock the same to the socket member, the pin 20 expanding the stud portion $h'$, and the latter being distorted by the anvil $c$. The die 7 contains a holding spring $7^a$ to hold the head of the socket member in moving the latter down toward the stud member.

Supported on the upper surface of the base 1 between the post 2 and said projection 5 are upper and lower horizontal guide ways 26, 27, respectively, provided, respectively, on their upper surfaces with longitudinal grooves 28, 29, leading forward to the space between the dies 7 and 10, heretofore described, and adapted respectively to deliver the head and stud parts to the dies with the head part above the stud part. The lower of these ways is supported on a post 30 rising from the base plate between the column 2, and the die support on the bracket 5, while the upper of said ways is supported on a vertically adjustable bracket piece 31, said bracket being provided with slots 32 to receive fastening screws 33 passing into the said post. The bracket 31 is provided with a vertical slot 34 through which passes a fastening screw 35 which also passes through the post heretofore described, in which the lower way is mounted, and engages said lower way to clamp it in position. By this arrangement the upper way is adjustable vertically relative to the lower way and the said lower way is adjustable longitudinally toward and away from the lower die member. Arranged in each of the grooves 28, 29, respectively, and reciprocable lengthwise thereof, in the said ways are plunger blades 36, 37, carried by plunger bars 38, 39, respectively, sliding in upper and lower horizontal guide openings 40, 41, in the vertical post 2, the rear ends of said plunger bars 38 and 39 being connected by links, 42, 43, to the depending portion 14 of the operating lever, the arrangement being such that when the said lever is swung toward the post 2 the plunger 6, and its die 7 will be raised while the blades 36, 37, will be moved forward longitudinally of the guide slots 40, 41, to move to the dies fastener parts which may have been deposited in said slots by supply and feed means to be presently described. It will be seen that the vertical portion 14 of the lever 13 extends upwardly across the planes of the guide ways and is so connected to the plunger bars 38 and 39 that when said lever is operated a thrust will be exerted on the plungers substantially in the direction of the movement of the fastener parts along the guide ways.

I will now proceed to describe the improved means for feeding fastener parts to said ways 26, 27. Supported on the upper portion of the post 2 is a horizontally disposed shaft 44 having its opposite ends projecting laterally beyond the side faces of the said post, and supporting on each of its ends a fixed non-rotatable plate 45, secured to said shaft by a set-screw 46, and having on its inner face an annular flange 47, see Figs. 7 and 8. Also mounted on the shaft between said arm 3 and each of the plates 45 is a rotatable drum 48 consisting of a head having an annular flange 49 to coöperate with the aforesaid flange 47 on the adjacent plate 45, each drum thereby forming with its adjacent plate a receptacle for the fastener parts to be assembled. The flange 49 of each drum is formed with a plurality of tangential slots 50 of a width slightly greater than the neck of the shank portion, or the head of the socket portion of the fastener parts. Connected to the lower forward end of each of said plates 45 is a feed chute 51, one of which leads to the guide way 26 and the other to the guide way 27, the lower end of each of said chutes opening into the side of the guide way into which it delivers the parts. Each of these chutes consists of a plate or strip of metal curved downward and, inward toward the way it supplies, and is formed on its inner face with a longitudinal groove 52 down which the fastener parts gravitate, said parts being held in the groove by side strips 53, 53, secured to the grooved face of the chutes. The said strips 53, 53, at their inner edges overhang the groove 52, so that the edges of the flanges of the fastener parts pass beneath the overhanging parts of said strips, and the shanks or heads pass between the adjacent edges of said strips. About the inner face of each plate 45 is a strip 54 forming a continuation of one of the strips 53, and a small section 55 forming a continuation of the other strip 53. The flange of each drum and the slots therein are so arranged with reference to the inlet end 56 of the guide channel in the chute that the fastener parts may pass therethrough, the flange of each of the drums being spaced from the circular portion of the plate 45 sufficiently to permit the flanges of the fastener parts to pass between the said flange and said plate and be delivered into the guide channel of the feed chute. Each of the plates 45 may be provided with an inlet hopper 57 through which the parts may be supplied to the drum, and may also be provided with an opening 58 closed by a threaded plug 59 through which the drum may be emptied of its contents. Each of the drums may be provided with one or more baffles 60, to agitate the parts contained therein, and exterior of each drum may be a flat spring 61 to push back into the drum any parts which may be carried around by the slots 50 and not delivered to the chute.

Means is provided for intermittently rotating the drums in order that the fastener parts will be shaken into proper position to pass through the tangential slots 50, which means I will now describe. Mounted on the inner face of each of the drums 48, fixed thereto, and surrounding the shaft 44, is a ratchet wheel 62 with which coöperates a pawl 63 pivoted as at 64, on a pawl carrier 65 fulcrumed on the shaft 44 and having a segmental rack 66 on its forward portion. Fulcrumed on the forward part of the head 3, as at 67 and on opposite sides of the latter are levers 68 having at their free ends segmental racks 69 which mesh with the segmental racks on the pawl carriers. Connecting each of the levers 68 with the overhanging part 15 of the operating lever is a link 70, whereby said levers 68 are pulled upward at the same time as the plunger 6, and the pawl carriers are thrown to cause the pawls to engage the ratchet wheels and revolve the drums. The pawls are yieldingly held in engagement with the ratchet wheels by springs 71 so that when the levers are moved downward, the pawls ride over the ratchets.

The strips 53, 53 which overlie the grooves in the chutes 51 are respectively formed with a recess 72 and a projection 73 directed toward said recess, the arrangement being such that the passage between said strips is provided with a lateral offset or deflection 74 providing a resting or supporting ledge or shoulder to catch and support the fastener parts as they descend the chute. Working in a transverse slot 75 in each of the chutes, and reciprocable lengthwise of the offset 74 is a thrust member 76 which serves to push the fastener supported on said ledge 74 out into the inclined portion 77 of the guide slot so that the fastener part may gravitate into the way to which the chute is connected. The inclined portion of the slot 77 is formed by one of the walls of the recess 72, and the lower inclined edge of the projection 73.

The thrust member is connected to a slide member 78 slidable in a slot 79 beneath the strips 53, 53 and movable transversely of the chute, said slide member being pivoted as at 80 to one end of a link 81, one end of one of said links being pivoted to a rocking lever 82 fulcrumed at its lower end on a rock shaft 83 having bearing in the base of the post. The upper end of the lever 83 is pivoted as at 84 to one end of a connecting link 85, the opposite end of which is pivoted at at 86 to the lever 13 below the fulcrum thereof. The opposite end of the rock shaft 83 carries a lever 87 to which is connected the link 81 on the opposite side of the machine for the push member for the opposite chute.

Carried by each of the members 78 is a finger 88 overlying the chutes and adapted to pass between the lowermost fastener part and the next adjacent part when the former is pushed from the ledge 74 by the push member into the inclined portion of the chute-way. The inner ends of the finger 88 and the push member 76 are so proportioned and arranged with relation to each other, that when one is withdrawn from the path of descent of the parts, the other is projected into position to support the column of parts.

The construction of the means for controlling the descent of the parts as just described forms no part of my invention the same being the invention of George H. Pullon, but I have described the same herein as being adopted by me in a machine constructed in accordance with my invention.

The outer end of the upper way 26 terminates just short of the plunger 6, and at the end of said way is provided means to receive a fastener part when it is thrust forward by the blade 36, and support it in the path of movement of said plunger to be moved by the latter toward the lower die. This means comprises two blocks 89, supported on opposite sides of the plunger and having semi-circular recesses 90, fitting about said plunger, said blocks being each supported by a leaf spring 91, secured at one end to the head 3, said spring serving to yieldingly hold the blocks in engagement with the plunger. At the side toward the end of the upper guide way, the blocks 89 are each provided with a recess 92 located above a shoulder 93, said recesses being adapted to form a passageway to receive the fastener parts, and leading to an annular seat 94 formed by inner semi-circular recesses in said blocks into which the fastener part is thrust by the finger 36 through the passageway formed by the recesses 90.

The blades 36 and 37 are preferably of such a length that they push the fastener parts into position directly under the die 7 into the annular seat in the blocks 89 and also the seat 25 so that the parts are arranged in proper position to be assembled upon downward movement of the plunger 6.

The parts being constructed as above described the operation of the machine is as follows: Assuming that the parts are in the position shown in Fig. 3, with the die 7 at the limit of its downward position, and a socket or head piece being in the groove of the guide way 36, and a stud in the groove of the guide way 37, the lever 13 is moved to a position opposite to that shown in Fig. 3. Whereupon the plunger 6 is raised and the blades 36, 37 move forward to push the fastener parts respectively into the seat in the blocks 89, and the seat 25. During this movement the push or thrust members 76 move forward from the position shown in Fig. 6 to the position shown in Fig. 5, to permit the lowermost part in each chute to gravitate onto the ledges 74, the fingers 88, being projected across the slots of the chutes beneath the next lowermost part to support the columns of parts. At the same time the levers 68 are raised to swing the pawl carriers downward to rotate the drums 48. The movement of the operating lever 13 is then reversed, whereupon the plunger 6 is moved downward, spreading the blocks 89 apart and the die 7 carrying the head part of the fastener down, and impressing it over the stud part supported on the die 10 to thereby clench said parts together. During this operation the blades 36 and 37 are moved to the position shown in Fig. 6, and the thrust members 76 push the fastener parts from the ledges 73, down into the chutes whence the said parts gravitate to the grooves of the guide ways 26, 27 as shown in Figs. 3 and 6, in position to be pushed to the dies when the operating lever is next operated in the direction shown by the arrows in Fig. 3. When the lever 13 is moved to the rear, the levers 68 are raised to pull the pawls 63 back into position to engage the ratchet wheels 62 to rotate the drums when the lever 13 is again moved forward, as above described.

It will be noted that the bottoms of the grooves in the guide ways 26, 27, are inclined upward from the rear ends thereof, toward the die members, and the blades 26, 27, enter the rear ends of said guide ways at a point above the lower portions of said grooves so that the recessed ends 26$^a$, 27$^a$, of the blades receive the shank or head of the fastener part as the case may be and project over the flanges of said parts when the parts are pushed forward and ride up the bottoms of the grooves, the flanges become clamped between the blades and said bottoms and are therefore delivered positively to the die members and prevented from dislodgment and consequent loss.

What I claim and desire to secure by Letters Patent of the United States is:

1. In a machine of the character described, the combination with coöperating die members adapted to assemble the parts of a fastener, of superposed guide ways leading to said members respectively, chutes leading to said guide ways to feed the parts to be assembled thereto, a plunger in each guide way to move the parts to the die member, a lever having operative connections with a die member, and means providing individual connections between said lever and said plungers, whereby the operations of feeding the parts to the die members and assembling them take place successively, as set forth.

2. In a machine of the character described, the combination with coöperating die members adapted to assemble the parts of a fastener, of superposed guide ways leading to said members respectively, chutes leading to said guide ways to feed the parts to be assembled thereto, a plunger in each guide way to move the parts to the die members, and a single lever for operating a die member and said plungers, said lever having a part extending across the planes of the guide ways and connected with said plungers so as to exert a thrust substantially in line with the direction of movement of the plungers.

3. In a machine of the character described, the combination with coöperating die members adapted to assemble the parts of a fastener, superposed guide ways leading to said members respectively, chutes leading to said guide ways to feed the parts to be assembled thereto, a plunger in each guide way to move the parts to the die members, and a lever for simultaneously moving said plungers and a die member out of the path of the plungers, said lever having a rigid arm extending upwardly across the planes of the guide ways and so connected with said plungers as to exert a thrust substantially in line with the direction of movement of said plungers.

4. In a machine of the character described, coöperating die members, superposed guide ways leading to said members respectively, chutes leading to said guide ways, to feed parts to be assembled thereto, means for delivering the parts to said chutes, a plunger in each guide way to move the parts to the die members, and an operating lever having operative connections with said plungers and said delivery means.

5. In a machine of the class described, the combination of coöperating die members, superposed guide ways leading to said members respectively, chutes leading to said guide ways to feed parts to be assembled thereto, horizontally acting means for feeding parts along said guide ways to said members, means for operating said feeding means comprising a rockable lever which extends upwardly across the planes of said guide ways, and means for so connecting the lever to the feeding means that when said lever is rocked a thrust will be exerted on said feeding means substantially in line with the movement of the parts along said guide ways.

6. In a machine of the character described, coöperating die members, superposed guide ways leading to said members respectively, chutes leading to said guide ways, to feed parts to be assembled thereto, a plunger in each guide way to move the parts to the die members, and an operating lever to move said plungers to feed the parts, and then withdraw the plungers and cause the dies to assemble the parts, said lever having an arm connected to said plungers and positioned so as to exert a direct thrust thereon substantially in line with the directions of the movements of the plungers.

7. In a machine of the character described, coöperating die members, a horizontal shaft, feed drums rotatable on said shaft, chutes leading from said drums, plungers for moving the parts from the chutes to the die members, and an operating lever having connections with the dies, drums and plungers.

8. In a machine of the character described, coöperating die members, superposed guide ways leading to said members respectively, chutes emptying into said guide ways, a plunger operating to move parts along each guide way to said die members, a horizontal shaft, drums revoluble on said shaft, and delivering parts to said chutes, and a lever having operative connections with said dies, drums, and plungers.

9. In a machine of the character described, a frame including a standard having a projection and an overhanging arm, die members operating respectively on said projection and arm, superposed guide ways leading to said die members, respectively, plungers reciprocable in said guide ways and guided by guide openings in said standard, means for feeding parts to said guide ways in advance of said plungers, and an operating lever connected to one of said die members and said plungers for operating the same.

10. In a machine of the character described, coöperating die members, superposed guide ways leading to said members, the bottoms of said guide ways being inclined upward toward the die members, and horizontally acting plungers reciprocable lengthwise of the guide ways movable in a path above the lower parts of said guide ways.

11. In a machine of the character described, coöperating die members, superposed guide ways leading to said members, the bottoms of said guide ways being inclined upward toward the die members, and horizontally acting plungers reciprocable lengthwise of the guide ways movable in a path above the lower parts of said guide ways, and on a substantial level with the upper parts of said guide ways.

12. In a fastener assembling machine, the combination with coöperating die members and an inclined guideway leading to said members, of means for delivering to said guideway a fastener member formed with a base flange, and means coöperating with said guideway for moving the fastener member along the guideway toward the die members with gradually increasing frictional grip.

13. In a machine of the class described, the combination of coöperating die members, a guide way leading to said members, the bottom of said guide way being inclined upward toward the die members, means for delivering a fastener member formed with a flanged base portion to the said guide way, and an article feeding device acting in a horizontal path above the lower part of said guide way and coöperating with the latter to grip the flange of the fastener member with gradually increasing force.

14. In a machine of the class described, the combination of coöperating die members, superposed guide ways leading to said members, the bottom of one of said guide ways being inclined upward toward the die members, and means for moving articles along the guide ways toward said members.

In testimony whereof, I have hereunto signed my name in the presence of two subscribing witnesses.

JOHN DRAHER.

Witnesses:
 EDWARD F. COLE,
 CLAYTON KLEIN.